June 29, 1954     G. H. AKLIN     2,682,198
PHOTOGRAPHIC OBJECTIVE CONSISTING OF
TWO NEGATIVE MENISCUS COMPONENTS
BETWEEN TWO POSITIVE COMPONENTS
Filed Sept. 20, 1952
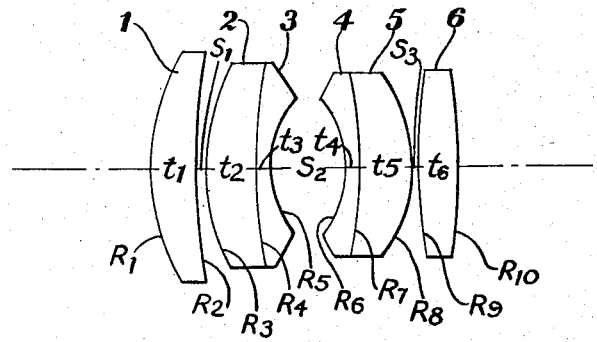
| EQUIVALENT FOCUS 100 mm. | | | | f/2.0 |
|---|---|---|---|---|
| LENS | N | V | RADII | THICKNESSES |
| 1 | 1.6968 | 56.1 | $R_1 = +60.9$ mm. | $t_1 = 11.0$ mm. |
|   |        |      | $R_2 = +179.3$    | $S_1 = 1.5$ |
| 2 | 1.7445 | 45.8 | $R_3 = +53.67$    | $t_2 = 12.5$ |
| 3 | 1.617  | 36.6 | $R_4 = +176.4$    | $t_3 = 3.5$ |
|   |        |      | $R_5 = +28.74$    | $S_2 = 17.5$ |
| 4 | 1.689  | 30.9 | $R_6 = -27.89$    | $t_4 = 3.5$ |
| 5 | 1.734  | 51.1 | $R_7 = -350.7$    | $t_5 = 13.0$ |
|   |        |      | $R_8 = -37.90$    | $S_3 = 1.3$ |
| 6 | 1.6968 | 56.1 | $R_9 = +184.8$    | $t_6 = 10.2$ |
|   |        |      | $R_{10} = -121.3$ | $B.F = 71.8$ |
George H. Aklin
INVENTOR.
BY Daniel I. Mayne
ATTORNEY
Harold F. Bennett
AGENT Patented June 29, 1954

2,682,198

UNITED STATES PATENT OFFICE 2,682,198

PHOTOGRAPHIC OBJECTIVE CONSISTING OF TWO NEGATIVE MENISCUS COMPONENTS BETWEEN TWO POSITIVE COMPONENTS

George H. Aklin, Rochester, N. Y., assignor to Eastman Kodak Company, Rochester, N. Y., a corporation of New Jersey Application September 20, 1952, Serial No. 310,701

1 Claim. (Cl. 88—57)

This invention relates to photographic objectives of the type consisting of a pair of meniscus negative doublets concave toward each other and aligned between a pair of simple components or singlets.

The object of the invention is to provide an objective of this type working at apertures up to f/2 and covering a moderate angular field of about ±15 or 20 degrees and which is very highly corrected for zonal spherical aberration, curvature of field, and astigmatism.

The lens type referred to above consisting of two negative doublets between two positive singlets is a well known type of photographic objective and has been adapted to a wide variety of uses ranging from wide-angle lenses in which all four components are meniscus in shape to copying lenses in which the two halves of the objective are symmetrical. They have been used in telescoping systems, in which case they are designed with particular attention to the zonal spherical aberration. Originally the cemented doublets were made compound merely for color correction and the two glass types used therein had substantially the same refractive index. In recent years, however, it has been found that considerable advantage could be derived from making up the doublets out of glasses differing considerably in refractive index and this has been previously thought to be particularly true of the rear doublet. An unrelated line of development has led into more complex types using three or four compound components or a cemented triplet component. The six-element objective, however, is a standard type, and any improvement in the correction of one of the aberrations without a corresponding worsening of the others may be considered an advance in the art.

According to the present invention, an objective of this type is particularly characterized by having the front negative meniscus doublet made up of a positive meniscus element whose refractive index is between 1.68 and 1.78 and a negative meniscus element cemented to the rear thereof having a refractive index lower than that of the positive element by between 0.10 and 0.18 and by having the front surface of this component convex with a radius of curvature between 0.46 and 0.66 times the focal length of the objective. The objective, according to the invention, is further characterized by the rear doublet being made up of a front negative meniscus element having a refractive index between 1.63 and 1.72 and a positive meniscus element cemented to the rear thereof and having a refractive index higher than that of the positive element by between 0.01 and 0.07. To derive the maximum benefit from these features of the invention, I find it advantageous to make up the positive singlets of glass having a refractive index between 1.65 and 1.76 and a dispersive index between 50 and 60, the front singlet being meniscus in shape and the rear singlet being biconvex with each surface having a radius of curvature between F and 10 F. To correct color the dispersive index of each negative element is preferably less on the average than 0.8 times the dispersive index of the positive element cemented thereto down to the limit of known materials at about 0.50. Conveniently, the thickness of each positive element is between 0.08 and 0.16 F and that of each negative element is between 0.02 and 0.06 F. The central air space is preferably between 0.14 and 0.22 F and each of the other air spaces is conveniently greater than zero and less than 0.04 F.

The cemented surface of the rear doublet preferably has a radius of curvature between F and 10 F and, as previously stated, is concave toward the front of the objective.

By means of the above characteristic features of the invention, I have designed a photographic objective which gives extremely sharp definition at an aperture of f/2.0 and over a moderately wide field of ±15 to 20 degrees and is highly satisfactory for use on the best grade motion-picture cameras.

According to a preferred form of the invention, an objective of the above type is made up in which the radius of curvature of each surface in order from front to rear is within the limits set forth in the following table:

$$0.50\ F < +R_1 < 0.70\ F$$
$$1.00\ F < +R_2 < 3.00\ F$$
$$0.46\ F < +R_3 < 0.66\ F$$
$$0.90\ F < +R_4 < 5.00\ F$$
$$0.26\ F < +R_5 < 0.32\ F$$
$$0.25\ F < -R_6 < 0.30\ F$$
$$1.00\ F < -R_7 < 10.00\ F$$
$$0.34\ F < -R_8 < 0.43\ F$$
$$1.10\ F < +R_9 < 4.00\ F$$
$$1.00\ F < -R_{10} < 3.30\ F$$

In this table the radius of curvature R of each surface as numbered by subscripts from the front to the rear is between the limits shown and the plus and minus values of R denote surfaces which are respectively convex and concave to the front. It may be noted that the limits are given in terms of the radius rather than in terms of the curvature which is of more direct optical significance.

This is done for greater convenience. Although some radii of curvature may appear to have a much wider range of values than others, actually the range in curvatures, F/R, is between 0.57 and 0.72 for all of the glass-air surfaces and is somewhat more than this for the cemented surfaces which are less sensitive.

The accompanying drawing shows in diagrammatic axial section an objective according to the invention and gives a table of specifications of one specific example thereof.

This table is repeated below for convenience:

[E. F.=100 mm.    f/2.0]

| Lens | N | V | Radii, mm. | Thicknesses, mm. |
|------|-----|------|------------|------------------|
| 1 | 1.6968 | 56.1 | $R_1 = + 60.90$ | $t_1 = 11.0$ |
|   |        |      | $R_2 = +179.3$  | $s_1 = 1.5$ |
| 2 | 1.7445 | 45.8 | $R_3 = + 53.67$ | $t_2 = 12.5$ |
| 3 | 1.617  | 36.6 | $R_4 = +176.4$  | $t_3 = 3.5$ |
|   |        |      | $R_5 = + 28.74$ | $s_2 = 17.5$ |
| 4 | 1.689  | 30.9 | $R_6 = - 27.89$ | $t_4 = 3.5$ |
|   |        |      | $R_7 = -350.7$  |             |
| 5 | 1.734  | 51.1 | $R_8 = - 37.90$ | $t_5 = 13.0$ |
|   |        |      |                 | $s_3 = 1.3$ |
| 6 | 1.6968 | 56.1 | $R_9 = +184.8$  | $t_6 = 10.2$ |
|   |        |      | $R_{10} = -121.3$ |           |
|   |        |      |                 | BF = 71.8 |

In this table the lens elements 1 to 6 are numbered in the first column and the respective refractive index N for the D line of the spectrum and the conventional dispersive index V are given in the second and third columns. The fourth column gives the radii of curvature $R_1$ to $R_{10}$ for the respective optical surfaces of the lens and the last column gives the axial thicknesses $t$ of the lens elements and the axial distances $s$ across the air spaces between components, each numbered by subscripts from front to rear.

It will be directly evident from the above table that this objective embodies all of the preferred features of the invention including an unusually high index difference $N_2 - N_3$ and a uniquely long radius of curvature $R_3$.

The following table shows the primary and secondary curvatures of this lens computed at three different angles of field:

| Angle | Primary Curvature | Secondary Curvature |
|-------|-------------------|---------------------|
| 10° | −0.24 | −0.13 |
| 14° | −0.43 | −0.14 |
| 16° | −0.65 | −0.14 |

As is readily seen from this table, this lens has an extremely flat secondary field and an unusually small zonal astigmatism and gives very sharp definition out to the edges of the field. The zonal spherical aberration also is unusually good for this type of lens.

I claim:

A highly corrected photographic objective consisting of two negative doublets aligned between two positive singlets in which the refractive indices N of the lens elements for the D line of the spectrum, radii of curvature R of the lens surfaces, the axial thicknesses $t$ of the lens elements and the axial distances $s$ between components, each numbered by subscripts from front to rear, are between the limits defined in the following table:

$$1.65 < N_1 < 1.76$$
$$1.68 < N_2 < 1.78$$
$$(N_2 - 0.18) < N_3 < (N_2 - 0.10)$$
$$1.63 < N_4 < 1.72$$
$$(N_4 + 0.01) < N_5 < (N_4 + 0.07)$$
$$1.65 < N_6 < 1.76$$
$$0.50\ F < +R_1 < 0.70\ F$$
$$1.00\ F < +R_2 < 3.00\ F$$
$$0.46\ F < +R_3 < 0.66\ F$$
$$0.90\ F < +R_4 < 5.00\ F$$
$$0.26\ F < +R_5 < 0.32\ F$$
$$0.25\ F < -R_6 < 0.30\ F$$
$$1.00\ F < -R_7 < 10.00\ F$$
$$0.34\ F < -R_8 < 0.43\ F$$
$$1.10\ F < +R_9 < 4.00\ F$$
$$1.00\ F < -R_{10} < 3.30\ F$$
$$0.08\ F < t_1 < 0.16\ F$$
$$0.0 < s_1 < 0.04\ F$$
$$0.08\ F < t_2 < 0.16\ F$$
$$0.02\ F < t_3 < 0.06\ F$$
$$0.14\ F < s_2 < 0.22\ F$$
$$0.02\ F < t_4 < 0.06\ F$$
$$0.08\ F < t_5 < 0.16\ F$$
$$0.0\ F < s_3 < 0.04\ F$$
$$0.08\ F < t_6 < 0.16\ F$$

where the + and − values of the radii indicate surfaces respectively convex and concave to the front.

References Cited in the file of this patent

UNITED STATES PATENTS

| Number | Name | Date |
|--------|------|------|
| 2,252,681 | Aklin | Aug. 19, 1941 |
| 2,416,032 | Warmisham et al. | Feb. 18, 1947 |
| 2,532,751 | Baker | Dec. 5, 1950 |

FOREIGN PATENTS

| Number | Country | Date |
|--------|---------|------|
| 564,133 | Great Britain | Sept. 14, 1944 |